(12) United States Patent
Weisel

(10) Patent No.: US 10,548,258 B2
(45) Date of Patent: Feb. 4, 2020

(54) SEED TAPE, SEED TAPE SYSTEM AND GREENING OR PLANTING SYSTEM

(71) Applicants: Niklas Weisel, Annaberg-Buchholz (DE); B + M TEXTIL GMBH & CO. KG, Sehmatal-Cranzahl (DE)

(72) Inventor: Niklas Weisel, Annaberg-Buchholz (DE)

(73) Assignees: B+M Textil GmbH & Co. KG, Sehmatal-Cranzahl (DE); Niklas Weisel, Annaberg-Buchholz (DE)

( * ) Notice: Subject to any disclaimer, the term of this patent is extended or adjusted under 35 U.S.C. 154(b) by 565 days.

(21) Appl. No.: 15/028,480

(22) PCT Filed: Sep. 29, 2014

(86) PCT No.: PCT/IB2014/064926
§ 371 (c)(1),
(2) Date: Apr. 11, 2016

(87) PCT Pub. No.: WO2015/052615
PCT Pub. Date: Apr. 16, 2015

(65) Prior Publication Data
US 2016/0249522 A1    Sep. 1, 2016

(30) Foreign Application Priority Data
Oct. 10, 2013 (DE) .................... 20 2013 104 576 U

(51) Int. Cl.
*A01C 1/04* (2006.01)
*A01G 25/02* (2006.01)

(52) U.S. Cl.
CPC .............. *A01C 1/042* (2013.01); *A01C 1/044* (2013.01); *A01G 25/02* (2013.01)

(58) Field of Classification Search
CPC ........... A01C 1/042; A01C 1/044; A01C 1/04; B65B 9/10; A01G 25/02; A01G 2025/006; A01G 25/06
See application file for complete search history.

(56) References Cited

U.S. PATENT DOCUMENTS 614,002 A    11/1898   Jenkins
1,143,980 A *   6/1915   McComb ............... A01C 1/044
                                         424/405
(Continued)

FOREIGN PATENT DOCUMENTS

CA        1302709 C    1/1987
CN        1111084 A    11/1995
(Continued)

OTHER PUBLICATIONS

Machine translation of DE 19504168 to Scholl dated Aug. 1996.*

*Primary Examiner* — Kathleen I Alker
(74) *Attorney, Agent, or Firm* — Laurence A. Greenberg; Werner H. Stemer; Ralph E. Locher

(57) ABSTRACT

A seed tape has seeds embedded at a spacing distance from one another in a tubular sleeve. There is provided a seed tape, a seed tape system, and a greening or planting system, which can be provided easily, which are environmentally friendly and with which various objects can be greened easily, efficiently and durably. The novel seed tape has a tubular sleeve which is a textile tube, which encloses the seeds in a stretched manner before and/or during the germination of the seeds and is unstretched between the seed positions. The seeds embedded in the textile tube are embedded in at least one substrate and/or are in contact with at least one substrate. The substrate is or includes potting soil and/or the substrate is formed of at least one fibrous and/or foamed organic or mineral material.

20 Claims, 3 Drawing Sheets

(56) References Cited

U.S. PATENT DOCUMENTS

| | | | | |
|---|---|---|---|---|
| 2,601,620 A | * | 6/1952 | Marshall | A01C 1/04 47/56 |
| 2,826,865 A | * | 3/1958 | Chohamin | A01G 20/00 47/56 |
| 3,328,916 A | * | 7/1967 | Haruto | A01C 1/042 260/DIG. 43 |
| 3,623,266 A | * | 11/1971 | Nakayama | A01C 1/042 206/423 |
| 4,780,988 A | * | 11/1988 | Mielke | A01C 1/042 47/58.1 R |
| 5,307,588 A | * | 5/1994 | Ullmann | A01C 1/044 47/56 |
| 5,309,673 A | | 5/1994 | Stoever et al. | |
| 6,446,386 B1 | * | 9/2002 | Holloway | A01C 1/044 47/56 |
| 2005/0236315 A1 | * | 10/2005 | McPhillips | A01N 25/08 210/205 |
| 2006/0156623 A1 | | 7/2006 | Ahm | |
| 2012/0005958 A1 | | 1/2012 | Laitsch | |
| 2013/0167436 A1 | | 7/2013 | Chornoby | |

FOREIGN PATENT DOCUMENTS

| | | | | |
|---|---|---|---|---|
| DE | 2445757 B2 | 4/1976 | | |
| DE | 3602060 A1 | 7/1987 | | |
| DE | 3804356 A1 | 6/1988 | | |
| DE | 3811926 A1 | 10/1989 | | |
| DE | 4114294 A1 | 11/1992 | | |
| DE | 19503671 A1 | 8/1995 | | |
| DE | 19504168 A1 * | 8/1996 | | A01C 1/042 |
| DE | 202012104884 U1 | 4/2013 | | |
| EA | 007584 B1 | 12/2006 | | |
| FR | 2566990 A1 * | 1/1986 | | A01C 1/042 |
| FR | 2592007 A1 * | 6/1987 | | A01C 1/042 |
| FR | 2614170 A1 * | 10/1988 | | A01C 1/042 |
| JP | H03290525 A | 12/1991 | | |
| JP | H110178818 A | 7/1998 | | |
| JP | H111266684 A | 10/1999 | | |
| RU | 2379872 C1 | 1/2010 | | |
| RU | 2428826 C1 | 9/2011 | | |
| RU | 114818 U1 | 4/2012 | | |
| WO | WO-2015140672 A1 * | 9/2015 | | A01C 1/042 |

\* cited by examiner

SEED TAPE, SEED TAPE SYSTEM AND GREENING OR PLANTING SYSTEM

BACKGROUND OF THE INVENTION

Field of the Invention

The present invention relates to a seed tape which has seeds embedded at a distance to one another in a tubular sleeve. The invention also relates to a seed tape system. Furthermore, the present invention relates to a greening or planting system for an object to be greened or planted.

By planting seeds or a substrate into the soil, a distance according to the plant variety of the individual seed grains is aspired to avoid crippled or stunted growth particularly of smaller seed grains. By a distance optimally adapted to the plant variety of the seed grains, the seeds are not hindered in their germination and a later warping of the sensitive seedlings can be avoided. To fix the seed grains in its distance to each other, seed tapes are used in many applications, which, besides the fixed position of the seed grains, provide the seeds with humidity respectively with required nutrients.

From the document DE 20 2006 013 567 U1, a seed tape is known, which is of a two-layer paper tape, wherein the seeds are provided between the paper layers in a constant distance to each other. The used paper, however, has the disadvantage that the tear resistance of the seed tape is not very high.

In the document DE 661 767 A it is described that the carrier material of a seed tape, which is of paper or a thin fabric, is additionally enhanced by a textile or paper thread to improve the tear resistance of the carrier material.

In a further example, which has been disclosed in the document DE 185 023 232 U, strap-shaped, water-soluble foils of synthetic material as carrier material for a seed tape are used, wherein the seeds, possibly a fertilizer and a thread is provided between the foil stripes. The foil parts are sealed by weld seam. The used synthetic material does not meet the environmentally conscious demands of today.

For this reason, a seed tape is suggested in the document DE 195 04 168 A, in which a natural fiber is used as carrier material, wherein the carrier material is provided of several layers. Thereby, natural vegetable or animal fibers or also a synthetic fiber of natural polymers such as viscose or cellulose can be employed as carrier material. The fiber must be decomposable in any case. Thereby, fiber compositions of flax, cotton, hemp, jute or viscose have been mentioned.

In the document DE 89 11 056 U1, a seed mat of at least two non-woven layers, which are of a natural fiber, particularly of jute, has been disclosed. Between the non-woven layers, a reinforcement tape is provided, on which the seeds are casted. The non-woven layers and the enclosed reinforcement tape are needled so that the seeds are fixed on its insertion position. These seed mats are particularly suitable for grass seeds respectively for greening of hillside locations because of their stability. When doing so, it is possible to fix the seed mat locally, whereby a slipping down, particularly during the early stage of the growing, can be avoided. As disadvantageous should be noted that by casting the seeds onto the reinforcement tape, an irregular seeding distance is the result.

The document DE 180 77 35 U describes a seed tape of the above-mentioned type, at which the seeds are embedded in a defined distance in a paper tape with tiny pockets or in a tubular sleeve. The seed tape is preferably of an easily decomposable material and can be enriched with artificial fertilizer in additional pockets or by impregnation with same.

Greening systems are used, for instance, for greening of facades or roofs. They not only serve as optically attractive exterior design of objects, but also improve the city air and thus, the overall wellbeing of the citizens.

In the document DE 20 2009 014 675 U1, a greening system is described, at which planting mats are provided at facades. Thereby, the seeds are provided on a substrate carrier, which is provided on a plastic plate. The plastic mat, in turn, is fixed at the facade. The substrate carrier thereby serves to hold the roots of the plants and the water.

The document DE 20 2012 104 884 U1 discloses a vertical greening system, at which a carrier plate with a distance to the wall is fixed by anchoring elements at load-bearing walls. Thereby, a rear ventilation is provided and thus, a wall humidification is prevented. On the carrier plate, a flat cover element of non-woven material is provided, which is folded such that planting pockets for the intake of the seeds are formed. This way, the substrate can form roots in the non-woven material. The described greening system, which is primarily used for moss, has water guiding profiles in order to provide the plants with water or also with fertilizer.

The document DE 10 2010 045 666 A1 describes a greening system, which is suitable for vertical and inclined surfaces. Hereby, the vegetation layer is fixed to a costly substructure respectively to an intermediate functional layer and has outgrowth holes from which the growing plant can unfold unhindered. A liquid supply can be provided by irrigation mats, which are arranged between the substructure and the vegetation layer.

BRIEF SUMMARY OF THE INVENTION

The object of the present invention is to provide a seed tape, a seed tape system as well as a greening or planting system, which can be provided easily, which are environmentally friendly and with which various objects can be greened easily, efficiently and durably.

The object of the present invention is solved by a seed tape of the above-mentioned type, in which the tubular sleeve is a textile tube, which encloses the seeds in a stretched manner before and/or during the germination of the seeds and is unstretched between the seed positions, wherein the seeds embedded in the textile tube are embedded in at least one substrate and/or are in contact with at least one substrate, and wherein the substrate is or comprises potting soil and/or the substrate is of at least a fibrous and/or foamed organic or mineral material.

A seed tape according to the invention is provided, which has spaced seeds embedded in a textile tube. According to the invention, seeds are understood as single as well as several not germinated seed grains as well as germinated seeds.

The textile tube used according to the invention, on the one hand, has a high elasticity in order to enclose the seeds to be embedded at the embedding position and, on the other hand, to fix it by the unstretched areas formed between the seed positions.

The seeds can be inserted directly in the interior of the textile tube for the production of the seed tape. The textile tube is thereby completely closed. A joining of single layers, as in the prior art, is thus not necessary according to the invention.

Since the textile tube of the seed tape according to the invention has a high stability and flexibility besides is high elasticity, the seed tape can be provided in any direction.

Furthermore, the used textile tube according to the invention has the ability to take and store liquid well, whereby the seeds are supported sufficiently in its germination process and which has an advantageous effect on the subsequent growth. The textile tube is thereby preferably provided coarsely meshed such that it does not hinder the process of the growing sprout.

In the present invention, the seeds are either embedded in a substrate in the textile tube or the seeds are in contact with the substrate in a different way. The substrate is not the textile tube and is not part of it, but can be made of the same material. This way, the substrate can be of potting soil and/or of at least one fibrous and/or foamed organic or mineral material.

With the substrate, an optimal rooting can be reached, for instance. Moreover, a fixation of the seeds can be realized with the substrate. The substrate can thereby store moisture in addition to the textile tube and thus, providing optimal growth conditions for the respective growing sprout. At least one fertilizer is and/or can be stored in the substrate, for instance.

The substrate can comprise, for instance, but is not limited to, at least one yarn, at least one thread and/or at least one rope and/or at least one non-woven mat and/or at least one non-woven tape. Thereby, the yarn, the thread, the rope, the non-woven mat and/or the non-woven tape are preferably textile material, to say material produced with textile technological steps.

The substrate can be provided at least partially of stone wool or a foam material.

Preferably, the material used for forming the substrate is predominantly or completely biodegradable. Thereby, hemp and/or flax and/or linen and/or coconut fibers and/or at least one protein and/or cellulose, for instance, can be used as biodegradable material.

In the present invention, the seeds can be inserted into the potting soil and/or the seeds can be glued to the at the at least one yarn, at the at least one thread and/or at the at least one rope, the at least one non-woven mat and/or the at least one non-woven tape and/or it can be turned in or twisted together into the at least one yarn, the at least one thread and/or the at least one rope and/or the non-woven tape. The at least one yarn, the at least one thread and/or the at least one rope, the at least one non-woven mat and/or the at least one non-woven tape can thereby serve as water supply as well as substrate for rooting.

In an advantageous embodiment of the seed tape according to the invention, the textile tube is knitted or braided or processed from at least one tape into a tube, whereby an elastic and solid textile tube is provided. Moreover, it is thereby possible to produce the seed tape according to the invention with low effort, wherein common knitting or braiding machines can be used. Furthermore, the seeds can already be inserted into the textile tube during the production of the textile tube.

The at least one yarn, the at least one thread and/or the at least one rope, the at least one non-woven mat and/or the at least one non-woven tape can be equipped with the seeds before the coating of the seeds by the tubular sleeve in a variation of the invention. In another embodiment of the invention, the seeds are added directly when coating, such as braiding or knitting, the at least one yarn and/or rope, the at least one non-woven mat and/or the at least one non-woven tape. Hence, the seeds can be fixed at the at least one yarn and/or rope, the at least one non-woven mat and/or the at least one non-woven tape, or the seeds are held loosely between the tubular sleeve and the at least one yarn, thread and/or rope, the at least one non-woven mat and/or the at least one non-woven tape.

The object is further solved by a seed tape system, in which at least two seed tapes of the above-mentioned type according to the invention are processed or twisted together to or into a planar textile.

Thereby, the seed tapes of the seed tape system can be interweaved or weaved into a planar textile, for instance. It is also possible to twist the seed tapes to a strand and thus, to produce solid seed ropes.

The object is further solved by a greening or planting system of the above-mentioned type, wherein the greening or planting system has at least one seed tape, having spaced seeds embedded in a textile tube and is provided on and/or at and/or in the object, wherein the textile tube encloses the seeds before and/or during germination of the seeds in a stretched manner and is unstretched between the seed positions, and wherein the seeds embedded in the textile tube is embedded in at least one substrate and/or is in contact with at least one substrate, and wherein the substrate comprises potting soil and/or the substrate is formed of at least one fibrous and/or foamed organic or mineral material.

The seed tape according to the invention, which has the above-mentioned advantages, is used in the greening or planting system according to the invention. Thereby, the greening or planting system according to the invention can be provided on and/or at and/or in an object, for instance, on a roof or at a facade or at a bottom. Because of the high elasticity and stability of the textile tube, the greening or planting system according to the invention can be provided without a costly holding construction at an optional distance to the object to be greened. When using the greening or planting system according to the invention at a facade, however, a distance is preferably to be kept between the greening or planting system and the facade for rear ventilation in order to prevent moisture from entering the facade.

Preferably, the greening or planting system according to the invention is provided at a building facade and/or a climbing scaffold and/or on a roof and/or on or in a bottom and/or on or in a terrace and/or on or in a dike, wherein this list is not exhaustive. The stability of the used textile tube according to the invention allows, as has already been mentioned, that the seed tape or the seed tape system can be provided without a costly substructure. Moreover, also small, blooming plants or climbing plants at facades of buildings or at climbing scaffolds can enliven facades or squares in a new way. Additionally, the greening or planting system according to the invention can be used to stabilize dikes and to simultaneously green dikes.

It is also possible to use the greening or planting system according to the invention for the fixation of rice seeds respectively for rice planting. For this purpose, seed tapes according to the invention, in which the seeds are inserted, or at least a seed tape system according to the invention, for instance, a seed tape fabric made of seed tapes according to the invention can be fixed in a bottom such as an irrigation terrace. Thereby, a crop failure, for instance, caused by floods, which become more and more frequent, can be prevented.

In the present invention, the seed tape or the seed tape system can be provided optionally on and/or at and/or in the object to be greened respectively planted. Thereby, guiding elements and/or fixing elements are provided for changing a laying direction and/or for fixing the seed tape or the seed tape system, whereby the seed tape or the seed tape system can be provided in any direction and the seed tape or the seed tape system is provided with the necessary hold at or on or in the object.

The seed tape or the seed tape system of the greening or planting system according to the invention can be led, for instance, meander-shaped at or on the surface of the object or in a depth of the object, whereby an even greening or planting of the object can be reached. In addition, the usable area is larger than of conventional greening or planting system due to the meander-shaped arrangement possibility of the greening or planting system according to the invention. Because of the increased usable area, the carbon dioxide level of the air, particularly in city areas, can be reduced, for instance.

It is particularly advantageous when the seed tape or the seed tape system of the greening or planting system according to the invention is coupled with at least one irrigation system. With the help of such an irrigation system, the growing plants can be provided with sufficient water respectively nutrient-enriched liquids.

In a particularly suitable embodiment of the invention, the irrigation system is provided in the interior of the textile tube. Preferably, a pipe-like or tubular irrigation system is thereby used, which is enclosed by the textile tube.

The irrigation system can be formed of single, coupled or connectable parts. Thereby, corresponding coupling elements can be provided at the ends of the parts of the irrigation system, through which single sections of the textile tube can be joined together optionally.

In a convenient variant of the greening or planting system according to the invention, the irrigation system has a coating, which is stable such that it can withstand the pressure of the irrigation liquid.

It is optionally provided that the coating is of a waterproof material and the coating has pores at positions at which seeds are provided. Thereby, the diameter of the pores is preferably designed such that a suitable fluid outlet through the pores is possible. Thus, the growing plants can be provided optimally with liquid respectively nutrients, wherein the fluid outlet can be only provided specifically at the seed respectively plant positions. Hence, an optimal and thus economical supply of the seeds respectively the plants can be realized.

According to a further embodiment of the present invention, the irrigation system of the greening or planting system has at least one irrigation pipe or an irrigation gutter, which has at least one opening in a pipe or gutter bottom region, at which at least one seed tape is suspended, wherein the irrigation pipe or the irrigation gutter is coupled with an supply for providing an irrigation fluid such as water into the irrigation pipe or the irrigation gutter. For irrigating the at least one seed tape, the irrigation pipe or the irrigation gutter is here flooded with water, whereby the water runs through the at least one opening into the irrigation pipe or the irrigation gutter and runs along at or in the seed tape, whereby the seeds of the seed tape are supplied with water.

Thereby, at least one hook and/or karabiner and/or at least one adjustable valve and/or at least one adjustable nozzle is provided. By the at least one valve or the at least one nozzle, an optimal water supply of the seeds with a simultaneously economical water consumption can be realized. Furthermore, the water supply can be adjusted to the respective seeds and/or to differentiated external conditions and growth conditions, for instance, various ambient temperatures or weather conditions.

Here, it is particularly favorable when the seed tape is provided over the hook or through the karabiner and/or led through the valve or the nozzle. The seed tape can be suspended advantageously at the hook or at the karabiner. When, for instance, the seed tape according to the invention is provided in form of a cord, said cord can be easily placed to its suspension over the hook or through the karabiner. Water running through the valve or the nozzle can be led directly at respectively into the seed tape in this embodiment of the invention. Thereby, hooks and/or karabiner can be used as fixing elements individually and/or in combination with valve and/or nozzle as irrigation elements. Likewise, valve and/or nozzle can also be used as irrigation elements without simultaneous usage of fixing elements such as hooks and/or karabiner.

Thereby, the seed tape can be fixed, in a convenient variant of the invention, with a knot or a loop, which is provided in or at the seed tape, at the irrigation pipe or the irrigation gutter. Such knots or loops are easily solvable so that single or all seed tapes can be replaced by new ones without much effort and/or the irrigation pipe or the irrigation gutter can be reused after expiration of a growth period.

BRIEF DESCRIPTION OF THE SEVERAL VIEWS OF THE DRAWING

Preferred embodiments of the present invention, their structure, function and advantages are explained in more detail in form of figures in the following, wherein FIG. 1 schematically shows a side view of a possible arrangement of a seed tape according to the invention.

DESCRIPTION OF THE INVENTION

Figure 1:
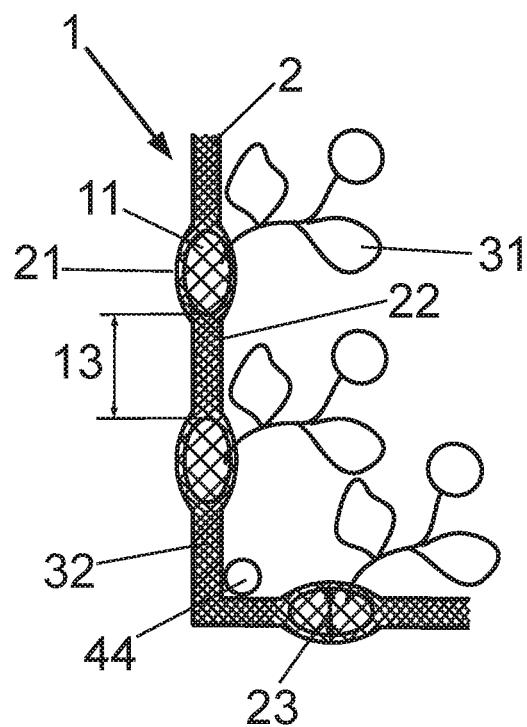

FIG. 1 shows a side view of a possible arrangement of a seed tape 1 according to the invention. Thereby, the seed tape 1, as shown, can be provided, for instance, angularly or circular, zigzag-shaped, linear, meander-shaped or randomly.

The seed tape 1 has a textile tube, in which seeds 11 are embedded in a distance 13, respectively. Thereby, individual spaced seed grains 12 or a plurality of seed grains 12 in germinated and/or non-germinated form can be embedded into the textile tube 2, respectively. Each distance 13 between the individual seed grains 12 is preferably, but not necessarily constant and is typically determined when producing the seed tape 1.

The textile tube 2 can be knitted, crocheted, warp-knitted or weaved, for instance. It thereby has a high elasticity. At the positions 21, at which one or several seed grains 12 are embedded, the textile tube 2 is stretched to a width 23. The seed grains 12 can be not germinated yet or can already have plant germs. At the sections 22, at which there is no seed grain 12, the textile tube 2 remains non-stretched and thus forms an intermediate barrier for the seeds 1 at these positions.

If only individual seed grains 12 shall be provided in a spaced manner in the textile tube 2, a maximum width 23 of the stretched textile tube 2 at the transverse extension of the seed grain 12 is adjusted, whereby the seed grain 12 can be fixed without any further intermediate elements at the embedding position. The non-stretched sections 22 of the textile tube 2 thereby fix the position of the seed grain 12.

In the embodiment shown in FIG. 1, the textile tube 2 is of a coarse meshed material so that the growing plants 31 are not hindered in their growth. Thereby, it is possible to additionally embed the seeds 11 in the textile tube 2 in potting soil 32 or in another suitable substrate. Thereby, the potting soil 32 or the substrate as well as the textile tube 2 serve as storage of water or also of fertilizer. Moreover, the potting soil 32 respectively the substrate stabilizes the embedded seeds 11 and supports the root development of the growing plants 31.

FIG. 1 demonstrates exemplary an angle guide of a seed tape 1 according to the invention. Because of the stability of the seed tape 1, it is sufficient to lead the seed tape 1, for instance, around a guiding and/or fixing element 44 attached to an object not shown here when changing the direction of the seed tape 1. Thereby, the guiding and/or fixing element 44 can be a nail, a screw, a rod or something similar, for instance. Furthermore, it is possible to place the seed tape tightly around the guiding and/or fixing element 44 due to the stability of the seed tape. Thus, the seed tape 1 can be fixed without any further fixation at the desired position of the guiding and/or fixing element 44. A shifting of the seed tape 1 at the guiding and/or fixing element 44 is avoided.

Figure 2:
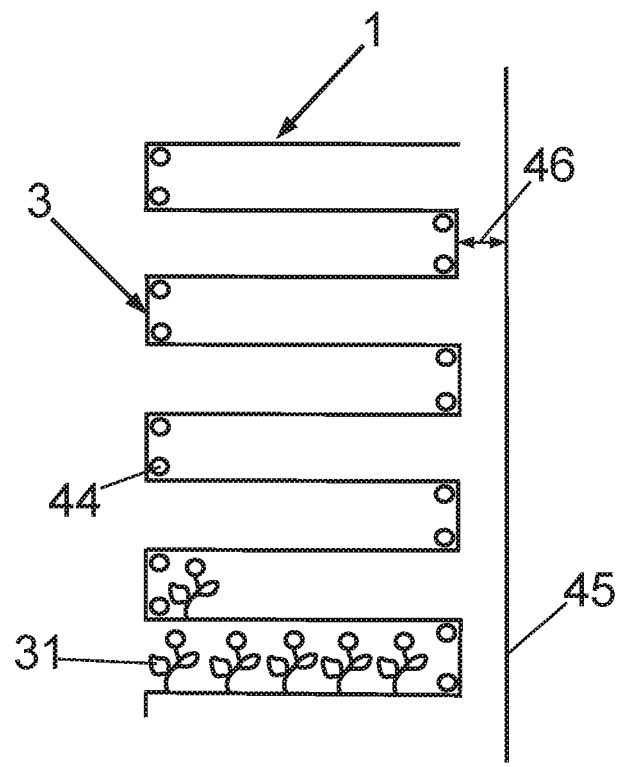
FIG. 2 schematically shows a side view of a possible variant of a greening or planting system according to the invention.

FIG. 2 shows the side view of a possible variant of a greening or planting system 3 according to the invention. Here, same references mean same components as in FIG. 1, which is why it is referred to the foregoing description of these components at this point.

The seed tape 1 shown in the embodiment is led meander-shaped around the guiding and/or fixing element 44 with a sufficient tension in front of a building facade 45. Thereby, the seed tape 1 can be shifted in any direction. It is of advantage when a distance 46 is provided between the building facade 45 and the nearest point of the greening or planting system 3. The distance 46 serves as rear ventilation of the building facade 45 and prevents that moisture of the greening or planting system 3 can penetrate into the masonry of the building facade 45.

Due to the meander-shaped arrangement of the seed tape 1, an increased greening space is the result in contrast to the greening and planting systems initially mentioned, whereby an optimal noise protection can be realized. Moreover, because of the increased density of the plants 31, the carbon dioxide reduction of the air is increased which particularly supports the usage of the greening or planting system 3 according to the invention in urban areas. Furthermore, the greening or planting system 3 according to the invention can be used to improve the appearance of dull building facades in cities. An arrangement of the greening or planting system is also appealing 3, in which the seed tape 1 is not led vertically but in any angle around the, for instance, rod-shaped guiding and/or fixing element 44, or several seed tapes 1 are arranged to a pattern.

Figure 3:
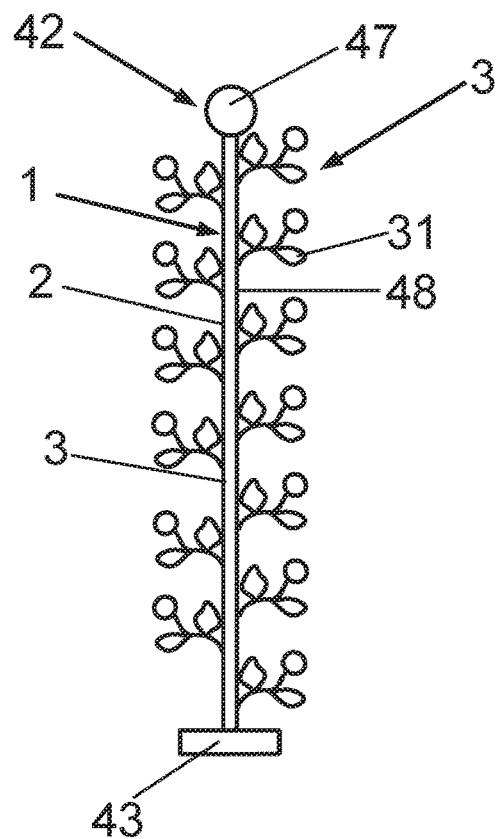
FIG. 3 schematically shows a side view of a further variant of a greening or planting system according to the invention.

FIG. 3 schematically shows the side view of a further embodiment of a greening or planting system 3 according to the invention. Here, same references as in the FIGS. 1 and 2 mean same components. It is herewith referred to the above descriptions of these components.

The seed tape 1 of the greening or planting system 3 of FIG. 3 is here fixed to a rod system 42, which stands on a base 43 in order to provide the required stability, also with a complete greening. The rod system 42 can be provided with an optically appealing end element, which could be a ball 47, for instance.

For instance, the seed tape 1 can be placed spirally around the rod 48 of the rod system 42, wherein a tightened guiding of the seed tape 1 is possible due to the stability of the seed tape 1. Additional fixing elements are not necessary in this embodiment. Due to the spiral guiding of the seed tape 1 around the rod 48 of the rod system 42 and the distance 13 of the seed grains 12, as is shown in FIG. 1, the plants 31 of the greening or planting system 3 can be arranged alternately at the rod 48. The result is an appealing look of a greening. Since the rod system 42 does not need to be fixed into the ground, it can be placed anywhere or can be moved to any other place.

Figure 4:
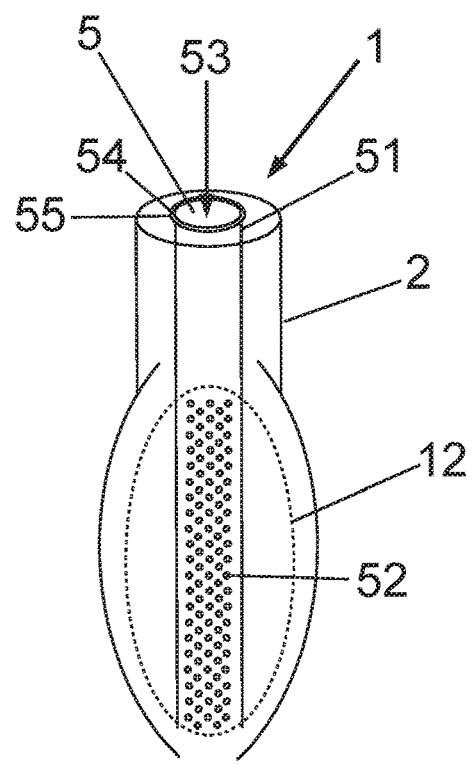
FIG. 4 schematically shows a perspective side view of a part of the seed tape of a possible variant of a seed tape according to the invention with an internal irrigation system.

FIG. 4 schematically shows the side view of a possible variant of a seed tape 1 according to the invention with an inner irrigation system 5. Here, already used reference signs mean same components, on whose foregoing description is herewith referred to.

In the embodiment shown in FIG. 4 of the seed tape 1 according to the invention and a greening or planting system 3 producible with this, a tubular or pipe-like irrigation system 5 is provided in the interior of the textile tube 2. The irrigation system 5 has a coating 51, which can be a waterproof synthetic material, in the shown embodiment. At the positions, at which one or several seed grains 12 are embedded in the textile tube 2, the coating 51 has pores 52, from which the irrigation liquid 53 can exit. The pores 52 of the coating 51 are formed such that a dosed liquid release can be provided to the seed grain/s 12 respectively to a not-shown plant 31 developing from a seed grain 12. Furthermore, an excessive liquid discharge from the coating 51 of the irrigation system 5 to positions, at which no liquid is needed, can be avoided.

In the embodiment of FIG. 4, the irrigation system 5 has already been provided in the interior of the textile tube 2 when the seed tape 1 was produced. Thereby, the seed tape 1 respectively the greening or planting system 3 provided therewith can be produced effectively. Moreover, in the embodiment shown, at ends 55 of parts of the irrigation system 5, a coupling element 54 is provided, respectively, whereby the parts or also two seed tapes 1 arranged side by side can be interconnected.

The coupling element 54 can be used to connect the irrigation systems 5 of two seed tapes 1 such that the textile tubes 2 of the individual seed tapes 1 are simultaneously connected without any gaps. It is of advantage when the coupling element 54 of the irrigation systems 5 of the individual seed tapes 1 are joined such that no liquid can leak from the coupling points in order to avoid any unnecessary waste of liquid.

By the possibility to sufficiently and systematically supply the plants 31 of the greening or planting system 3 from the interior of the seed tape 1 with nutriment and water, a novel greening or planting system 3 is provided, which can be integrated optically good in a cityscape, for instance, without any additional costly fixations and water pipes integrable in the greening or planting system 3.

Figure 5:
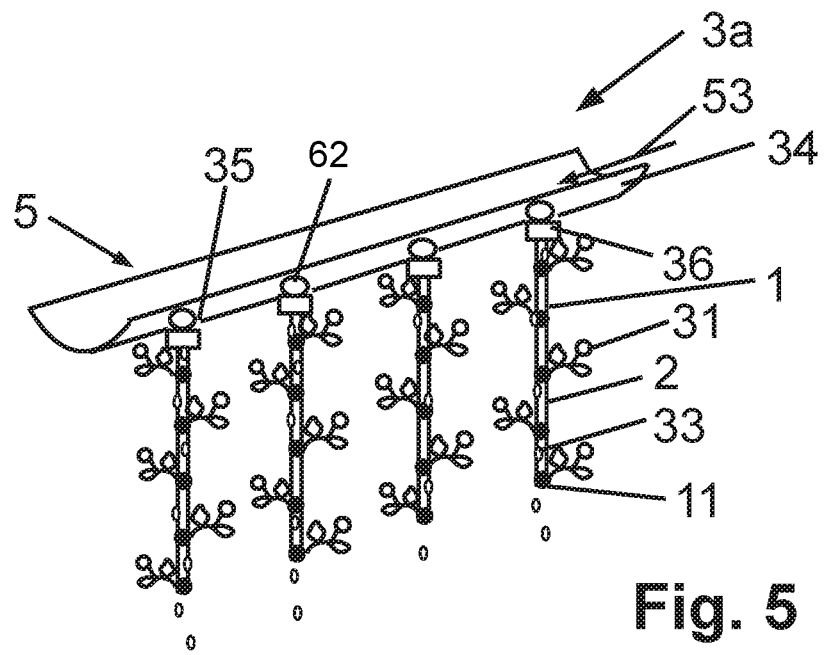
FIG. 5 schematically shows a perspective view of another embodiment of the greening or planting system according to the invention.

FIG. 5 schematically shows a further embodiment of a greening or planting system 3a according to the invention. The greening or planting system 3a has an irrigation gutter 34, in whose bottom area, an opening 35 is provided. In other not-shown embodiments of the invention, an irrigation pipe can be used instead of the irrigation gutter 34. The irrigation gutter 34 or the irrigation pipe is coupled with a not-shown water inlet so that the irrigation gutter 34 or the irrigation pipe, as is schematically indicated by the arrow, can be flooded with water.

In the openings 35, at least one seed tape is suspended, respectively. The fixation of the respective seed tape at or in the opening 35 can be done, for instance, via at least one knot 62 or a corresponding loop provided respectively inserted in or at an end region of the seed tape 1. Furthermore, in the embodiment shown, at each opening 35, an adjustable valve 36 is provided. The valve 36 can be provided as screw-on valve, for instance. Instead of the valve 36, an adjustable nozzle can also be used, for instance.

The water 33 led into the irrigation gutter 34 respectively the irrigation pipe penetrates through the openings 35 and then flows down the seed tapes 1, wherein the seeds 11 of the seed tapes 1 are watered. Excess water 33 drops down.

Figure 6:
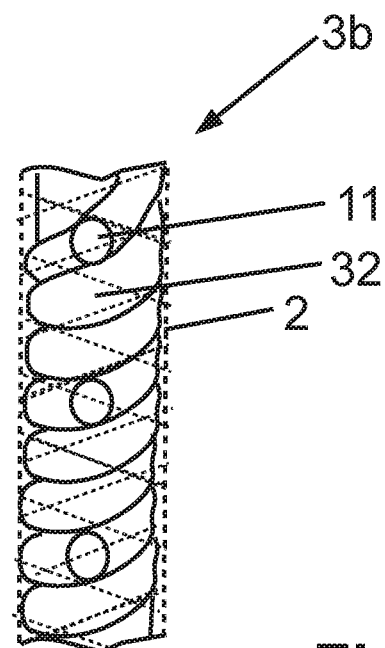
FIG. 6 schematically shows a side view of a further variant of the greening or planting system according to the invention

FIG. 6 schematically shows a further variant of the greening or planting system 3b according to the invention. The greening or planting system 3b uses a substrate 32 for inserting the seeds 11. The substrate 32 is a substrate part shown in FIG. 6 of the embodiment, which is of a natural respectively biodegradable material such as hemp, flax, linen, coconut fibers, protein, silk, and/or cellulose. The substrate part is wound around individual seed grains of the seeds 11. The substrate 32 hereby forms a good basis for root development at the seeds 11 and additionally provides the possibility for a good water inlet to the seeds 11 and for at least temporarily water storage in the substrate 32.

In other, not-shown embodiments of the present invention, instead of the substrate part, other substrates 32, for instance, loose and thick, preferably biodegradable non-woven mats or non-woven tapes can be used.

The invention claimed is:

1. A seed tape, comprising:
   a tubular sleeve being a textile tube;
   a plurality of seeds embedded in said tubular sleeve at stretched embedding positions at a spacing distance from one another;
   said textile tube enclosing said seeds in a stretched manner before and/or during a germination of the seeds;
   said textile tube having un-stretched sections defining a recess containing at least one substrate therein, said un-stretched sections being between embedding positions, said un-stretched sections of said textile tube with said at least one substrate defining an intermediate barrier for fixing said seeds in said embedding positions;
   said seeds in said textile tube being at least one of embedded in said at least one substrate or in contact with said at least one substrate, said at least one substrate including at least one of potting soil, fibrous material, foamed organic material, or mineral material.

2. The seed tape according to claim 1, wherein said textile tube is at least one of the following: knitted, braided, twisted to at least one string, or processed from at least one tape.

3. The seed tape according to claim 1, wherein said at least one substrate includes an element selected from the group consisting of at least one yarn, at least one thread, at least one rope, at least one non-woven mat, and at least one non-woven tape.

4. The seed tape according to claim 3, wherein said seeds are fixed at the at least one substrate or said seeds are held loosely between said tubular sleeve and said at least one substrate.

5. The seed tape according to claim 1, wherein said at least one substrate and/or said textile tube is formed primarily or completely of a biodegradable material.

6. The seed tape according to claim 5, wherein said biodegradable material is a material selected from the group consisting of hemp, flax, linen, coconut fibers, silk, at least one protein, and cellulose.

7. A seed tape system, comprising: at least two seed tapes according to claim 1 processed to or into a planar textile or twisted with each other.

8. The seed tape system according to claim 7, wherein said at least two seed tapes are interwoven or are woven into said planar textile.

9. A greening or planting system for an object to be greened or planted, the greening or planting system comprises: at least one seed tape according to claim 1 or a seed tape system formed of at least two said seed tapes processed into a planar textile or twisted with each other and disposed on and/or at and/or in the object.

10. The greening or planting system according to claim 9, wherein the object is a structure selected from the group consisting of a building facade, a climbing scaffold, a roof, a floor, a terrace, and a dike.

11. The greening or planting system according to claim 9, wherein said seed tape and/or said seed tape system is provided with spaced guiding and/or fixing elements at or on the object.

12. The greening or planting system according to claim 9, which comprises an irrigation system coupled with said seed tape and/or said seed tape system.

13. The greening or planting system according to claim 12, wherein said irrigation system is conducted through said textile tube.

14. The greening or planting system according to claim 13, wherein said irrigation system is formed of a plurality of parts that are coupled with each other.

15. The greening or planting system according to claim 12, wherein said irrigation system is pipe-shaped or tubular.

16. The greening or planting system according to claim 12, wherein said irrigation system comprises a coating formed with pores for a discharge of an irrigation liquid from the pores.

17. The greening or planting system according to claim 12, wherein said irrigation system comprises at least one irrigation pipe or irrigation gutter, which has at least one opening, at which at least one seed tape is suspended, in a pipe or gutter bottom area, wherein said irrigation pipe or irrigation gutter is coupled with an inlet for inserting an irrigation liquid into said irrigation pipe or into said irrigation gutter.

18. The greening or planting system according to claim 17, which comprises at least one element selected from the group consisting of a hook, a karabiner, an adjustable valve and an adjustable nozzle provided at said at least one opening.

19. The greening or planting system according to claim 18, wherein said seed tape is provided over said hook or through said karabiner and/or is led through said valve or said nozzle.

20. The greening or planting system according to claim 17, wherein said seed tape is fixed with at least one knot or a loop, and said knot or loop is provided at said seed tape, at said irrigation pipe or said irrigation gutter.

* * * * *